May 8, 1934. J. J. GLAUSER 1,957,707
APPARATUS FOR THE CONTINUOUS MANUFACTURE OF
ICE CREAM AND OTHER FROZEN FOOD PRODUCTS
Filed Feb. 20, 1932 3 Sheets-Sheet 1

INVENTOR

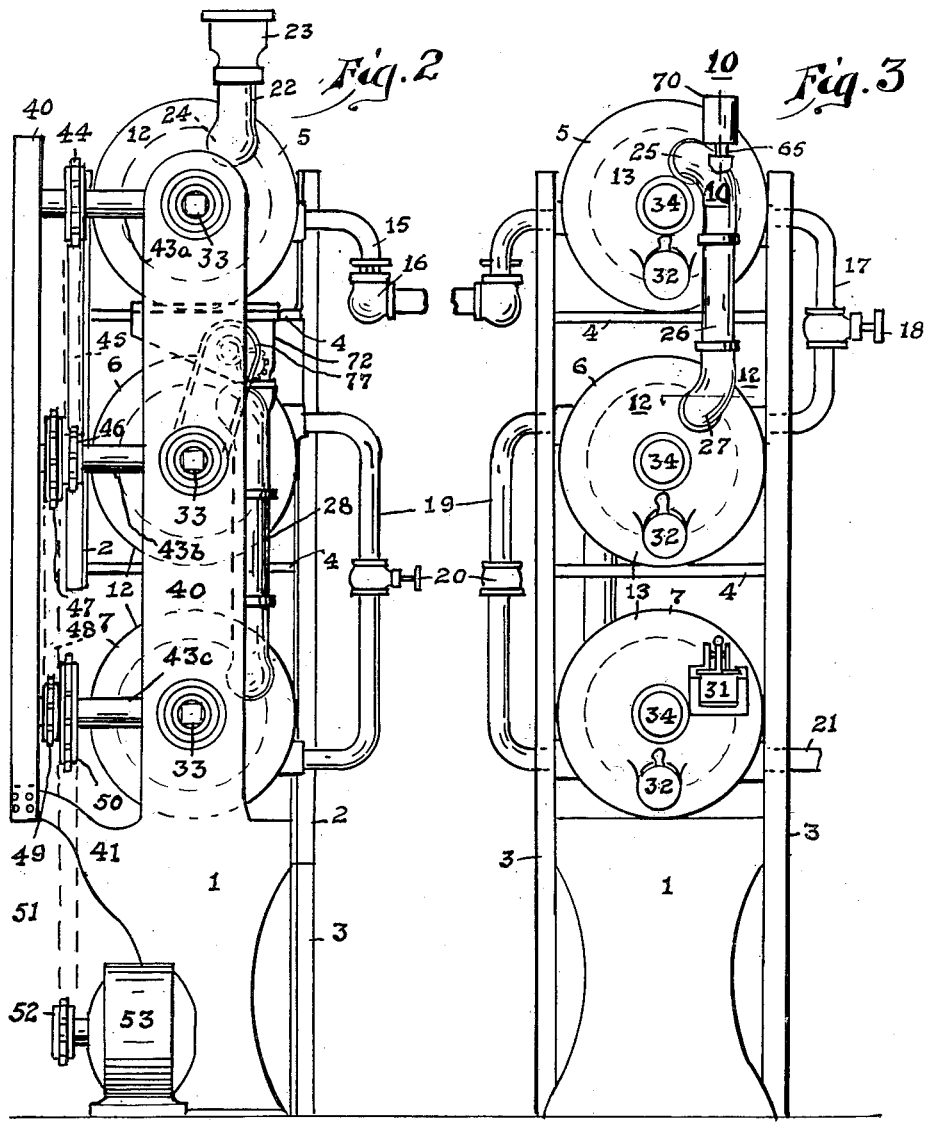

May 8, 1934.   J. J. GLAUSER   1,957,707
APPARATUS FOR THE CONTINUOUS MANUFACTURE OF
ICE CREAM AND OTHER FROZEN FOOD PRODUCTS
Filed Feb. 20, 1932   3 Sheets-Sheet 3
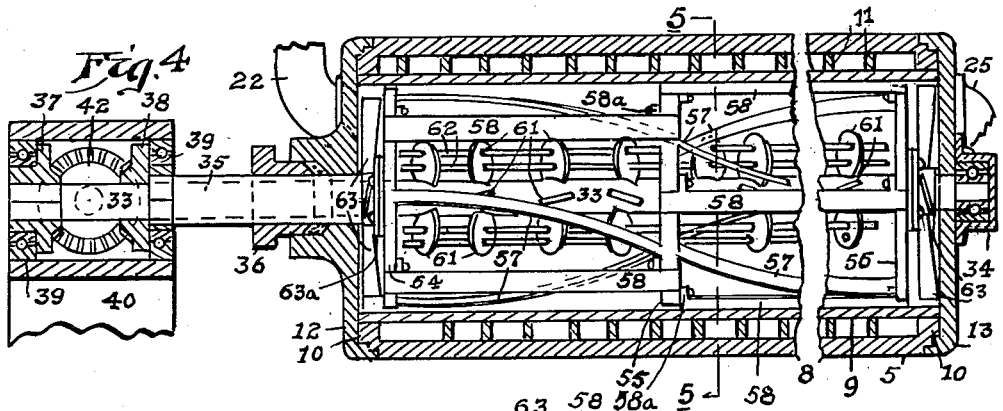
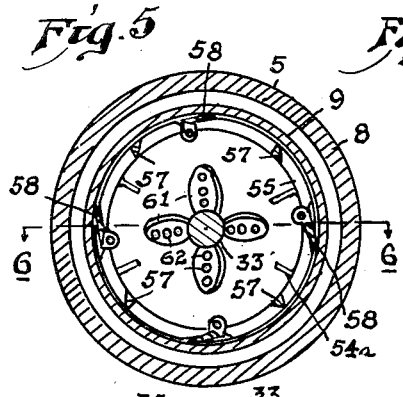
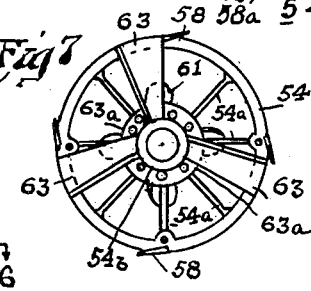
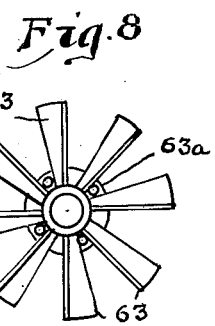
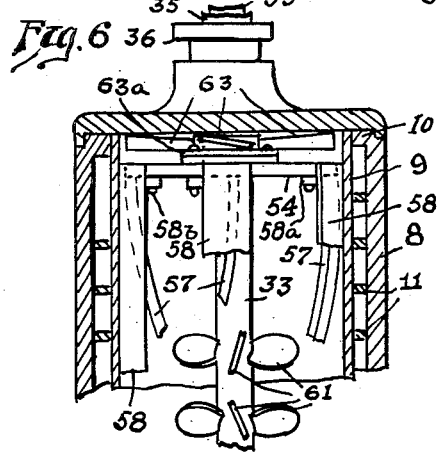
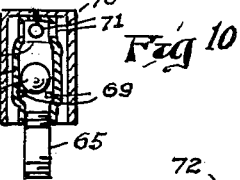
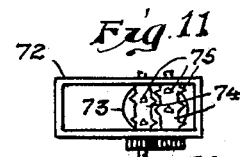
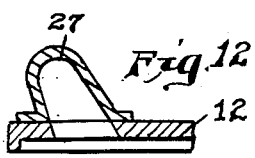
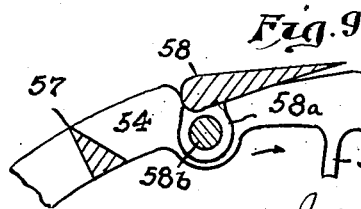
INVENTOR
John J. Glauser
by Edward A. Lawrence
his Attorney Patented May 8, 1934

1,957,707

UNITED STATES PATENT OFFICE 1,957,707

APPARATUS FOR THE CONTINUOUS MANUFACTURE OF ICE CREAM AND OTHER FROZEN FOOD PRODUCTS

John J. Glauser, Pittsburgh, Pa.

Application February 20, 1932, Serial No. 594,237

13 Claims. (Cl. 259—69)

This application is, in part, a continuation of my pending patent application Serial Number 339,573, filed in the United States Patent Office on February 13, 1929.

The object which I have in view is the provision of an improved machine for the continuous manufacture of ice cream and the like for the purpose of effecting substantial savings in the time and labor employed and also an improvement in the quality of the product.

In general my improved machine comprises a plurality of horizontally disposed cylindrical chambers arranged in superimposed relation and connected together in series, the cylinders being subjected to refrigeration as by means of brine circulating through jackets surrounding the cylinders. The material, such as flavored cream or other substances in a liquid state, is introduced into the top cylinder and is caused to travel through the same and in turn through the remaining cylinders and is discharged from the lowermost cylinder in semi-frozen state sufficiently fluid to permit its travel, and the semi-solidified product is filled into cans and other containers and then hardened in a cold room.

During the progress of the material through the machine it is thoroughly agitated to impart a fine and smooth texture to the product, and for this purpose I provide rotary agitators. I also provide rotary means for causing the material to travel lengthwise of the cylinders and for preventing the material adhering to the walls of the cylinder.

I furthermore provide rotary means for drawing the material into the intake end of the cylinder and expelling the material from the discharge end of the cylinder.

I provide means for admitting air into the cylinder with the material, which air is thoroughly mixed with the product by the action of the agitators. The admission of air into the product results in a fluffy, light product of superior attractiveness.

To insure the proper treatment of the material as it passes through the machine I connect the cylinders in such a manner that the more liquid contents of a cylinder are retained therein while the more solidified portions of the contents are passed onto the next cylinder.

The arrangement is such that the degree or intensity of agitation is progressively increased as the materials pass through the machine.

Furthermore I provide means for adding food substances to the product for flavoring, such as fruit, nuts and the like.

Other novel features of construction and also of arrangement of parts will appear from the following description.

In the accompanying drawings wherein I have illustrated a practical embodiment of the principles of my invention, Fig. 1 is a front elevation of the machine.

Fig. 2 is an end elevation thereof looking from the left in Fig. 1.

Fig. 3 is an opposite end elevation of the machine.

Fig. 4 is a broken longitudinal section of the uppermost of the machine cylinders and its driving connections showing the rotary beaters, the scrapers, the conveyers, the impeller and the expeller.

Fig. 5 is a cross sectional view taken along the line 5—5 in Fig. 4.

Fig. 6 is an incomplete longitudinal section of one of the cylinders taken along the line 6—6 in Fig. 5.

Fig. 7 is a face view of the rotary impeller looking from the left in Fig. 4.

Fig. 8 is a face view of the expeller of the bottom cylinder looking from the right in Fig. 1.

Fig. 9 is a fragmentary detail, partially in section showing the mounting of the conveyer blades and the scraper blades on one of the spiders.

Fig. 10 is a section of one of the air-inlet valves taken along the line 10—10 in Fig. 3.

Fig. 11 is a top plan view of the means for introducing fruits, nuts or other substances into the product.

Fig. 12 is a detail in section taken along the line 12—12 in Fig. 3.

Figure 1:
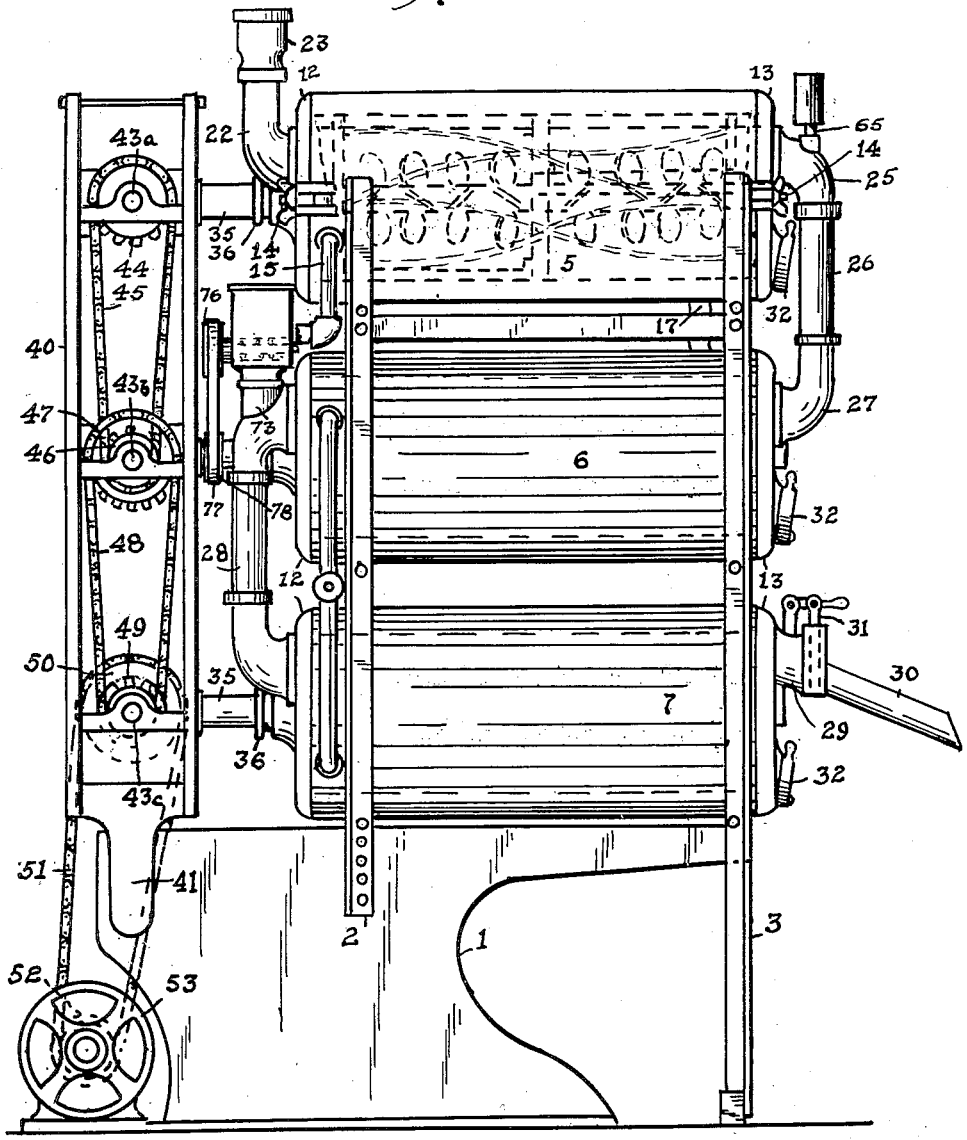

Referring to the drawings, 1 represents the base of the machine, preferably a casting and of the general contour shown. 2 and 3 represent pairs of vertically disposed supports or stands fixed relative to the base, and provided with horizontal cross members 4 for the support of the horizontally disposed cylinders 5 and 6. A third cylinder 7 is supported by the top of the base. The cylinders are fixed in place by any convenient means. The clinders 5, 6 and 7 are in superimposed relation as shown. Any desired number of cylinders may be provided. I have successfully used three.

Said cylinders are provided with jacketed walls to provide passages through which the refrigerating agent, usually brine, is caused to travel. Thus 8 represents the outer cylindrical wall, which may be cast, and 9 the inner cylindrical wall which may be of tubing. The ends of the outer wall 8 are provided with internal annular shoulders 10 into which the ends of the inner wall 9 fit and to which said wall is fixed, as by welding or soldering, providing a fluid-tight joint.

To direct the flow of brine over substantially the entire surface of the wall 9, I provide a helical partition 11 between the inner and the outer wall.

The two ends of the cylinders are closed by the removable heads 12 and 13, respectively, which may be fastened in place by the swing bolts 14 or by other convenient and readily operated means. For the sake of clearness the fastening means are omitted except for the left hand end of the top cylinder in Fig. 1.

A pipe 15, provided with a valve 16 and communicating with a supply of brine or other suitable refrigerating agent, connects to one end of the helical passage between the inner and outer walls of the top cylinder 5. A pipe 17 connects the other end of said passage to the corresponding end of the like passage between the inner and outer walls of the intermediate cylinder 6, said pipe being provided with a valve 18. Again a pipe 19 provided with a valve 20 connects the other end of the helical passage of the intermediate cylinder with the corresponding end of the bottom cylinder 7. A return pipe 21, leading back to the brine supply, is connected to the opposite end of the helical passage of the bottom cylinder.

Thus a continuous current or circulation of refrigerant is maintained within the double walls of the cylinders.

The temperature maintained in the cylinders is preferably between zero Fahr. and about seven degrees below zero.

22 represents a material-supply pipe preferably provided with an upwardly expanded receiving end 23 to which the material, such as the flavored cream, is supplied at a measured and controlled rate. The pipe connects to the interior of the top cylinder 5 through an inwardly expanding port 24 in the head 12 located above the axis of the cylinder.

The outlet of the cylinder 5 is located at the other end of said cylinder where the head 13 is provided with an outwardly extending and outwardly contracting pocket 25 located above the axis of the cylinder and connected to the pipe 26 with a similar pocket 27 in the corresponding head 13 of the intermediate cylinder 6. The pockets may be cast integral with the heads or may be separate from the heads and connected thereto at ports in said heads.

The inlet and outlet ports are so formed that friction is minimized and the travel of the material into and from the cylinders is unimpeded.

The other ends of the cylinders 6 and 7 are connected in like manner by the pipe 28, the connections through the head 12 between the pipe and the cylinders being located above the axes of the latter.

At the other end of the bottom cylinder 8 its head 13 is provided with an exit pocket 29 into which is connected a relatively short product-discharge pipe 30 provided with an adjustable closure or gate 31. The pocket 29 is above the axis of the cylinder 7.

The cylinders are provided at one end with an outlet port located below their axes and provided with a gate 32 for cleansing.

The product discharged from the pipe 30 is received in cans or other containers and taken to the cold room for the usual hardening.

It will be seen that the material travels in opposite directions through adjacent cylinders.

I provide means in each cylinder for thoroughly mixing and refining the material and also for causing the material to travel into, through and out of the cylinders.

Thus 33 represents a shaft disposed axially of the cylinder and having its one end, the right end in Figs. 1 and 4, stepped in an antifriction cup-bearing 34 carried by the head 13, while its other end extends through the center of the opposite head 12. The shaft is nested in and rotates within a sleeve 35 which extends through a packing gland 36 in the head 12. The shaft 33 protrudes beyond the outer end of the sleeve 35 and the shaft and sleeve have their ends squared to fit the bores of the opposed bevelled pinions 37 and 38 respectively. These pinions are provided with hubs having cylindrical outer surfaces which are journaled in antifriction bearings 39 mounted in portions of a vertical frame 40 rising from a lateral extension 41 of the base 1.

Interposed between the pairs of pinions 37 and 38 corresponding to each shaft and sleeve is a bevelled pinion 42 mounted on a counter shaft which is disposed at right angles to the corresponding shaft 33 and the sleeve 35. The pinions 42, corresponding respectively to the cylinders 5, 6 and 7, are fixed on counter-shafts 43a, 43b and 43c, respectively, which shafts are journaled in suitable bearings supported at the proper relative elevations by the frame 40.

The shaft 43a is provided with a relatively large sprocket 44 which is connected by a chain 45 with a relatively small sprocket 46 on the shaft 43b. The shaft 43b is also provided with a large sprocket 47 connected by a chain 48 with a small sprocket 49 on the shaft 43c. The shaft 43c is also provided with a large sprocket 50 connected by a chain 51 with a small sprocket 52 driven as by the motor 53. A suitable speed-reduction mechanism may be interposed, if desired, between the motor and the sprocket 52.

It will thus be seen that the shaft for each cylinder and the sleeve in which the shaft is nested will rotate in opposite direction; also that the shafts in adjacent cylinders will rotate in opposite directions as will also the sleeves in adjacent cylinders, and, again that the shaft and sleeve of the top cylinder will rotate at a less speed than those of the intermediate cylinder and those of the intermediate cylinder will rotate at a less speed than the shaft and sleeve of the bottom cylinder.

A spider 54 is fixedly mounted on the inner end of the corresponding sleeve 35 in each of the cylinders adjacent to the cylinder head 12, said spider comprising a circular perimetral rim of less diameter than the internal diameter of the cylinder, an axial hub and spokes supporting the rim therefrom. A similar spider 55 is rotatably mounted on the shaft 33 at the center of the cylinder and a third spider 56 is rotatably mounted on the shaft adjacent to the cylinder head 13. The spiders are of the open spoke type to permit the free passage of material. Thus the spider 54 has its rim supported by spokes 54a from its hub 54b.

57 represents a plurality of conveyer blades, shown as three in number and of helical shape rigidly mounted at their ends on the rims of the spiders 54 and 56 and intermediately supported by the rim of the spider 55 so that as the sleeve and spiders rotate the contents of the cylinder will be caused to travel longitudinally of the latter.

The blades in cylinder 5 are set to cause the material to travel from left to right in Fig. 1; the blades in cylinder 6 cause the material to travel from right to left, and the blades in cylinder 7 cause the material to travel from left to right. The conveyer blades are set to clear the wall of the cylinder and are preferably of triangular cross-sectional shape as indicated in Fig. 8.

58 represents the longitudinally disposed scraper blades which are mounted on the spiders and which are straight bars of substantially the cross sectional shape shown in Fig. 8 with their knife edges directed in the direction of the rotation of the spiders as indicated by the arrow. The ends of the blades are provided with pierced lugs 58a which are pivotally attached as by bolts or pins 58b to pierced lugs 54a formed on the inner surface of the rims of the spiders.

The scraper blades are of the proper length to be supported by adjacent spiders and the scrapers at one end of the cylinder are staggered in relation to those in the other end of the cylinder. A scraper blade is thus in advance of each of the conveyers.

The resistance of the contents of the cylinder to the moving scraper blades holds their knife edges against the inner wall of the cylinder.

Mounted on the shaft 33 between the spiders are the agitator paddles 61. Circumferentially disposed series of said paddles are provided with their contact faces arranged angularly to the axis of the shaft, and the inclination of members of an annular series alternate and the paddles in one series are alternately inclined to the corresponding paddles in adjacent series so that these paddles do not convey the material but by the opposition of each paddle to those adjacent cause a true mixing and fining action. The paddles may be mounted on the shaft 33 in any convenient manner.

To increase the mixing and fining action I bore holes through the paddles and mount on them the connecting rods 62 which are disposed parallel to the shaft 33 and which greatly augment and improve the mixing and fining of the product.

To cause the entrance of the material into one end of a cylinder and its discharge from the other end of the cylinder I provide propellers for drawing in and expelling the material.

The propellers shown are of fan-like type comprising blades 63 extending radially from the annular disk 63a. The disk may fit up against the end face of the hub of the end spider adjacent to the port being disposed concentrically with the hub, the disks being bolted or riveted in place so that the propeller rotates with the spider.

The blades of the propellers are inclined in the proper direction to draw in the material through an inlet port, as at the intake end of the cylinder 5, or to expel the material through the outlet port, as at the discharge end of said cylinder.

As the material progressively solidifies as it travels through the apparatus, the propelling force must be progressively increased. Thus I have shown the propeller 63 at the inlet end of the top cylinder provided, as illustrated in Fig. 7, with three blades, while the propeller at the discharge port of the bottom cylinder, as illustrated in Fig. 8, is provided with eight blades. Thus, the propeller at the discharge end of cylinder 5 may be provided with four blades, those at the inlet and discharge ports of the cylinder 6 with five and six blades, respectively, and that at the inlet port of cylinder 7 with seven blades.

To obtain the desired fineness and lightness in the product, it is necessary to admit air to the cylinders during the freezing process. Thus I have shown an air inlet valve connected to the pipe 26 which conducts the material from the discharge end of the top cylinder to the intake end of the intermediate cylinder.

The same may consist of a short vertical pipe 65, the lower end of which is screwed into a threaded hole in the top wall of the pocket 25 of the top cylinder-head 13, and the upper end of which has mounted thereon the valve body 66 containing the ball 67 which seats upwardly against the annular valve seat 68 and which is supported in its depressed position by the fingers 69. The upper end of the body 66 is closed and 70 represents a cylindrical skirt which is supported by the valve body and which depends outside of said body, the latter having ports 71 in its side walls above the ball seat.

It is evident that as the material travels downwardly through the pipe 26 air will be sucked in through the valve but in case of back pressure in said pipe the ball will seat and prevent escape of material.

Similar air-inlet valves may be provided in the connections between cylinders 6 and 7 or elsewhere as may be found advisable.

Fruit, nuts, and other substances are frequently incorporated in ice cream and other frozen food products and I provide convenient means for introducing the same into the main materials of the product during the process of manufacture.

Thus 72 represents a hopper or gravity feed container having its throat connected by a tube 73 supported by and communicating with the interior of the pipe 28 which connects the cylinders 6 and 7. Working in the throat of the hopper are a pair of geared-together feed rolls 74 which may be provided with spurs 75 to augment their feeding action. These rolls are driven by means of a sprocket 76 mounted on one of the rolls and connected by a chain 77 to a ring sprocket 78 fixed on the sleeve 35 of the intermediate cylinder 6.

The fruit or nuts reduced to proper size are supplied to the hopper and are fed into the product as it passes from cylinder 6 to cylinder 7 and are uniformly distributed throughout the product in the bottom cylinder.

It will be noted that the inlet ports are above the axes of the cylinders, thus admitting the material to the areas of less pressure and thereby facilitating the travel of the material.

It will be noted that the ports through which the material is discharged from the top and intermediate cylinders are located also above the axes of said cylinders. Thus the more solidified portions of the contents of the cylinders are discharged while the more liquid contents, which remain in the lower portion of the cylinders, are retained until they become more solidified and rise to the top. Through this arrangement the material is retained in the cylinders until the solidifying function is properly performed.

The removal of the heads 13 permits the withdrawal of the shafts, the sleeves and the associated parts bodily through the open ends of the cylinders, thus facilitating the cleansing of the apparatus and its parts.

My improved machine makes the manufacture of ice cream and other frozen products a commercial success. The time and labor required is greatly reduced compared to the methods now in general use.

My machine has proved itself to be a commercial success, and the product has a fineness of grain and a superiority of quality hitherto not characteristic of such products.

I claim:—

1. In apparatus for manufacturing ice cream and other frozen products by the continuous method, the combination with a horizontally disposed freezing chamber having ports in its opposite ends for the admission and the discharge of the material, of means for causing material to travel longitudinally of the chamber, means for agitating the material within the chamber, and rotary means comprising fan-like blades radially disposed to and inclined to the axis of rotation adjacent the discharge port for continuously expelling the material through said discharge port.

2. In apparatus for manufacturing ice cream and other frozen products by the continuous method, the combination with a horizontally disposed freezing chamber having ports in its opposite ends for the admission and the discharge of the material, of means for causing material to travel longitudinally of the chamber, means for agitating the material within the chamber, rotary means comprising fan-like blades radially disposed to and inclined to the axis of rotation adjacent the inlet port to draw material into the inlet port, and like rotary means disposed adjacent the outlet port to expel the material through the outlet port.

3. In apparatus for manufacturing ice cream and other frozen products by the continuous method, the combination of a horizontally disposed freezing chamber having ports in its opposite ends for the admission and the discharge of the material, the outlet port being above the longitudinal axis of the chamber whereby the more solidified portions of the material only are discharged through said discharge port, rotary means for conveying the material longitudinally of the chamber, means for agitating the material within the chamber, and a rotary expeller within the chamber comprising fan-like blades radially disposed to and inclined to the axis of rotation adjacent the discharge port for discharging the material through said port.

4. In apparatus for manufacturing ice cream and other frozen products by the continuous method, the combination of a plurality of horizontally disposed freezing chambers arranged in superimposed relation, said chambers being connected together in series for the downward passage of the material through said chambers in turn, the connection being such that the material is discharged from the chambers at a point above the center of the chamber whereby the more solidified material is withdrawn from and the more fluid material remains in said chamber, means for agitating the material within said chambers comprising rotary fan-like blades radially disposed to and inclined to the axis of rotation, and means for causing the material to pass from one chamber to the other.

5. In apparatus for manufacturing ice cream and other frozen food products by the continuous method, the combination with a horizontally disposed freezing chamber having an inlet port at one end and a discharge port at the other end thereof, of rotary means for agitating the contents of the cylinder, and a rotary propeller comprising fan-like blades radially disposed to and inclined to the axis of rotation adjacent to one of the ports and arranged to cause the material to pass through said port.

6. In apparatus for manufacturing ice cream and other frozen products by the continuous method, the combination with a horizontally disposed freezing chamber having an inlet port at one end and an outlet port at the other end of the chamber, said outlet port being located above the axis of said chamber, rotary means for agitating the contents of the chamber, and a rotary propeller comprising fan-like blades radially disposed to and inclined to the axis of rotation located at the inner end of the discharge port and arranged to expel the product therethrough.

7. In apparatus for manufacturing ice cream and other frozen products by the continuous method, the combination of a plurality of horizontally disposed freezing chambers arranged in superimposed relation and connected together in series for the downward passage of the material through said chambers in turn, the inlet ports and outlet ports of said chambers being located at the ends of said chambers, rotary agitating means within said chambers, and rotary propellers comprising fan-like blades radially disposed to and inclined to the axis of rotation within said chambers and adjacent said ports for causing the entrance of said material into and its egress from said chambers.

8. In apparatus for manufacturing ice cream and other frozen products by the continuous method, the combination of a plurality of horizontally disposed freezing chambers arranged in superimposed relation and connected together in series for the downward passage of the material through said chambers in turn, the inlet ports and outlet ports of said chambers being located at the ends of said chambers and above the axes of the chambers, rotary agitating means within said chambers, and rotary propellers comprising fan-like blades radially disposed to and inclined to the axis of rotation within said chambers and adjacent said ports for causing the entrance of said material into and its egress from said chambers.

9. In apparatus for manufacturing ice cream and other frozen products by the continuous method, the combination of a plurality of horizontally disposed freezing chambers arranged in superimposed relation and connected together in series for the downward passage of the material through said chambers in turn, the inlet ports and outlet ports of said chambers being located at the ends of said chambers, rotary agitating means within said chambers, and rotary propellers comprising fan-like blades radially disposed to and inclined to the axis of rotation within said chambers and adjacent said ports for causing the entrance of said material into and its egress from said chambers, said propellers being arranged to apply progressively increased force to the material as its degree of solidification increases as the material travels through the apparatus.

10. In apparatus for manufacturing ice cream and other frozen food products, the combination with a plurality of horizontally disposed freezing chambers arranged in superimposed relation, said chambers having inlet ports and outlet ports at their opposite ends and the chambers being connected together in series for the downward passage of material through said chambers in turn and agitating and conveying means in said chambers, of a rotary propeller within each chamber adjacent to the outlet port for expelling the material, the propeller of each chamber having greater driving power than the propeller of the chamber next above whereby as the material is progressively solidified during its travel through said chambers it is expelled from all the chambers at substantially the same rate.

11. In apparatus for manufacturing ice cream and other frozen food products, the combination with a plurality of horizontally disposed freezing chambers arranged in superimposed relation, said chambers having inlet ports and outlet ports at their opposite ends and the chambers being connected together in series for the downward passage of material through said chambers in turn and agitating and conveying means in said chambers, of a rotary propeller comprising fan-like radially disposed blades mounted in each chamber adjacent to its outlet port for expelling the material from the chamber, the propeller of each chamber having more blades than the propeller of the chamber next above whereby as the material progressively solidifies in its travel through the chambers it is expelled from all the chambers at substantially the same rate.

12. In apparatus for manufacturing ice cream and other frozen food products, the combination with a plurality of horizontally disposed freezing chambers arranged in superimposed relation, said chambers having inlet ports and outlet ports at their opposite ends and the chambers being connected together in series for the downward passage of material through said chambers in turn and agitating and conveying means in said chambers, of rotary propellers within each chamber adjacent to the inlet port and the outlet port to introduce the material into and expel it from the chamber, and the propellers in each chamber being more powerful than the propellers in the chamber next above whereby as the material progressively solidifies during its travel through the chambers it will be introduced into and expelled from the chambers at substantially the same rate.

13. In apparatus for manufacturing ice cream and other frozen food products, the combination with a plurality of horizontally disposed freezing chambers arranged in superimposed relation, said chambers having inlet ports and outlet ports at their opposite ends and the chambers being connected together in series for the downward passage of material through said chambers in turn and agitating and conveying means in said chambers, of rotary propellers within each chamber adjacent to the inlet and outlet ports thereof to introduce the material into and expel it from the chamber, said propellers comprising fan-like radially disposed blades, and the propellers in each chamber having a greater number of blades than have the propellers of the chamber next above whereby as the material is progressively solidified during its travel through the chambers it will be introduced into and expelled from the chambers at substantially the same rate.

JOHN J. GLAUSER.